(12) United States Patent
Van Meter, III

(10) Patent No.: US 6,964,008 B1
(45) Date of Patent: Nov. 8, 2005

(54) DATA CHECKSUM METHOD AND APPARATUS

(75) Inventor: Rodney Van Meter, III, San Mateo, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/439,776

(22) Filed: Nov. 12, 1999

(51) Int. Cl.$^7$ .......................... G06F 11/10; G11C 29/00
(52) U.S. Cl. ...................... 714/807; 714/766
(58) Field of Search ................. 714/746, 751, 714/752, 753, 754, 757, 758, 759, 763, 766, 777, 701, 798, 800, 807, 712, 48, 49, 52; 360/53; 369/53.31, 53.35, 59.39

(56) References Cited

U.S. PATENT DOCUMENTS

| | | | |
|---|---|---|---|
| 5,208,813 A | * | 5/1993 | Stallmo |
| 5,255,136 A | | 10/1993 | Machado et al. ........ 360/77.02 |
| 5,260,703 A | | 11/1993 | Nguyen et al. ........... 371/37.5 |
| 5,341,249 A | | 8/1994 | Abbot et al. ................. 360/46 |
| 5,373,512 A | * | 12/1994 | Brady |
| 5,499,337 A | * | 3/1996 | Gordon |
| 5,500,864 A | * | 3/1996 | Gonia et al. |

OTHER PUBLICATIONS

"Implementing the Internet CheckSum in Hardware", Touch and Parham, ISI, RFC 1936, Apr. 1996.
"Computing the Internet Chekcum", Barden, Borman, Partridge, ISI, RFC 1071, Sep. 1988.

* cited by examiner

Primary Examiner—Christine T. Tu

(57) ABSTRACT

A method and apparatus for generating checksum values for data segments retrieved from a data storage device for transfer into a buffer memory, is provided. A checksum list is maintained to contain checksum values, wherein the checksum list includes a plurality of entries corresponding to the data segments stored in the buffer memory, each entry for storing a checksum value for a corresponding data segment stored in the buffer memory. For each data segment retrieved from the storage device: a checksum value is calculated for that data segment using a checksum circuit; an entry in the checksum list corresponding to that data segment is selected; the checksum value is stored in the selected entry in the checksum list; and that data segment is stored in the buffer memory. Preferably, the checksum circuit calculates the checksum for each data segment as that data segment is transferred into the buffer memory.

29 Claims, 12 Drawing Sheets

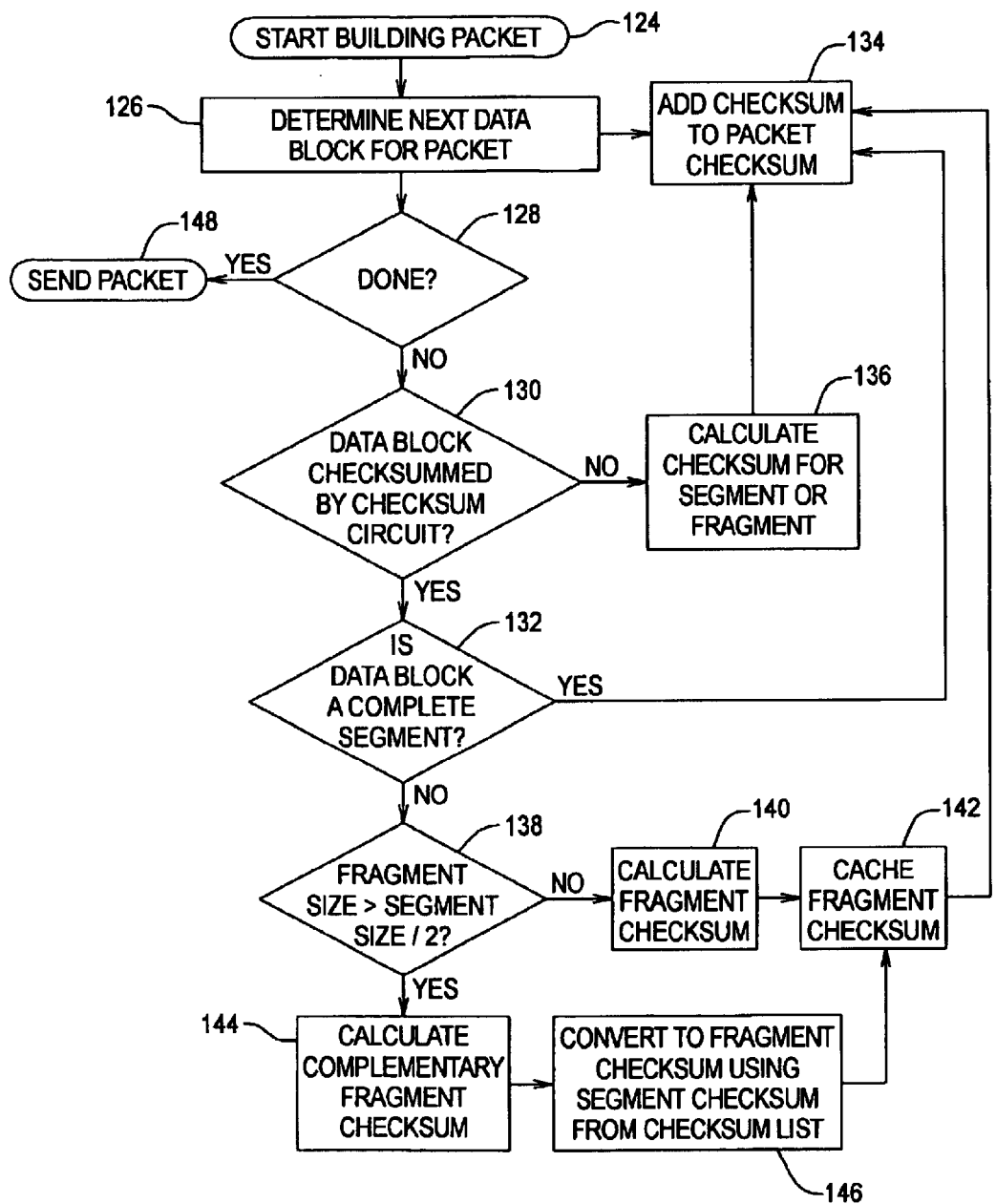

FIG. 11

| PACKET NUMBER | RELATIVE SEGMENT NUMBERS | CUMULATIVE BYTES | MODULO 512 | FRAGMENT SOFTWARE CHECKSUMMED | SOFTWARE CHECKSUM SIZE |
|---|---|---|---|---|---|
| 0 | 0-2 | 1460 | 436 | OUTER | 76 |
| 1 | 2-5 | 2920 | 360 | OUTER | 152 |
| 2 | 5-8 | 4380 | 284 | OUTER | 228 |
| 3 | 8-11 | 5840 | 208 | INNER | 208 |
| 4 | 11-14 | 7300 | 132 | INNER | 132 |
| 5 | 14-17 | 8760 | 56 | INNER | 56 |

DATA CHECKSUM METHOD AND APPARATUS

NOTICE OF INCLUSION OF COPYRIGHTED MATERIAL

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to providing data checksums, and in particular to providing checksums for data retrieved from data storage devices.

BACKGROUND OF THE INVENTION

Data processing systems typically include several data processors interconnected via a network for data communication, wherein one or more of the data processors include at least one data storage device. Upon a request from a requester processor, data is retrieved from a data storage device of a data processor and a checksum is generated for the retrieved data. The retrieved data and checksum are then transferred to the requester, wherein the requester computes a checksum for the received data and compares it to the received checksum to detect end-to-end data transfer errors.

A major disadvantage of conventional techniques for generating checksums is that such checksums are calculated using software routines as a separate pass over the data retrieved from the data-storage device before the data is transferred to the requester. Specifically, the software checksum calculation occurs after the retrieved data is stored in a buffer memory, and before the retrieved data is transferred to the requester. The process for performing the software checksum is executed on a processor unit, such as a 32-bit central processing unit (CPU). The overhead for software checksum calculation can be for example nineteen CPU instructions to checksum thirty two bytes of data. As such, the software checksum calculation consumes precious computing time and resources. Such high overhead degrades data communication response, and negatively impacts the performance of data processing systems.

There is, therefore, a need for a method and apparatus to efficiently determine checksums for data retrieved from data storage devices.

BRIEF SUMMARY OF THE INVENTION

The present invention satisfies these needs. In one embodiment, the present invention provides a method of generating checksum values for data segments retrieved from a data storage device for transfer into a buffer memory. The method includes the steps of maintaining a checksum list comprising a plurality of entries corresponding to the data segments stored in the buffer memory, each entry being for storing a checksum value for a corresponding data segment stored in the buffer memory. The method further includes the steps of, for each data segment retrieved from the storage device: calculating a checksum value for that data segment using a checksum circuit; providing an entry in the checksum list corresponding to that data segment; storing the checksum value in the selected entry in the checksum list; and storing that data segment in the buffer memory. Preferably, the step of calculating the checksum further includes the steps of calculating the checksum for that data segment using the checksum circuit as the data segment is transferred into the buffer memory.

For transferring packets of data out of the buffer memory, a checksum value can be calculated for data in each packet based on one or more checksum values stored in the checksum list. Providing a checksum value for each packet includes the steps of calculating the checksum value for that packet as a function of at least one checksum value stored in the checksum list. In one case, each packet in a set of the packets includes one or more data segments; and the steps of providing a checksum value for each of the packets in the set of packets further includes the steps of: retrieving the checksum value for each data segment in that packet from a corresponding entry in the check list; and calculating a checksum value for that packet as a function of the retrieved checksum values.

In another case, each packet in a set of the packets includes: (i) one or more complete data segments, and (ii) a fragment of each of one or more data segments. Providing a checksum value for each of the packets further includes the steps of: retrieving the checksum value for each of the one or more complete data segments in that packet from a corresponding entry in the checksum list; calculating an intermediate checksum value as a function of the retrieved checksum values; for each fragment of a data segment in that packet, calculating a checksum value for data in that data segment fragment; and adjusting the intermediate checksum value using the checksum values for said one or more data segment fragments to provide a checksum value for all of the data in that packet.

Yet in another case, each packet in a set of the packets includes: (i) at least one complete data segment, and (ii) a fragment of each of one or more data segments. Providing a checksum value for data in each of the packets in the set of packets further includes the steps of: retrieving the checksum value for the at least one complete data segment in that packet from a corresponding entry in the checksum list; for each of the one or more data segment fragments in the packet, retrieving the checksum value from the entry in the checksum list corresponding to the data segment of which that data segment fragment is a part, and calculating a checksum value for data in a complementary fragment of that data segment; calculating an intermediate checksum value as a function of the retrieved checksum values; and adjusting the intermediate checksum value using the checksum values for said one or more complementary data segment fragments to provide a checksum value for all of the data in that packet.

In another aspect, the present invention provides a storage device comprising storage media for storing data segments; buffer memory; and a checksum circuit for providing checksum values for data segments retrieved from the storage media for transfer into the buffer memory, and for storing the checksum values in a checksum list including a plurality of entries corresponding to the data segments stored in the buffer memory, each entry for storing a checksum value for a corresponding data segment stored in the buffer memory. As such, for transferring packets of data out of the buffer memory, a checksum value can be calculated for data in each packet based on one or more checksum values stored in the checksum list. The checksum circuit comprises a logic circuit for calculating a checksum value for a data segment; means for locating an entry in the checksum table corresponding to that data segment; and means for storing the checksum value in the located entry in the checksum list. The storage device can further comprise a microcontroller configured by program instructions according to the method of the present invention for transferring packets of data out of the buffer memory, and for providing a checksum value for data in each packet.

The present invention provides significant performance improvements for data service from storage devices such as disk or tape drives through a buffer memory onto a network. Calculating checksums using a checksum circuit as data is transferred into a buffer memory substantially reduces memory bandwidth consumed and the number CPU instructions cycles needed for software checksums. Further, data transfer latency for checksums is reduced.

BRIEF DESCRIPTION OF THE DRAWINGS

These and other features, aspects and advantages of the present invention will become understood with reference to the following description, appended claims and accompanying figures where:

FIG. 9 shows a flow diagram of an embodiment of a process for packaging data segments into packets, and calculating checksums for the packets;

FIG. 11 is a table of checksums for data segment fragments in packets;

DETAILED DESCRIPTION OF THE INVENTION

Figure 1:
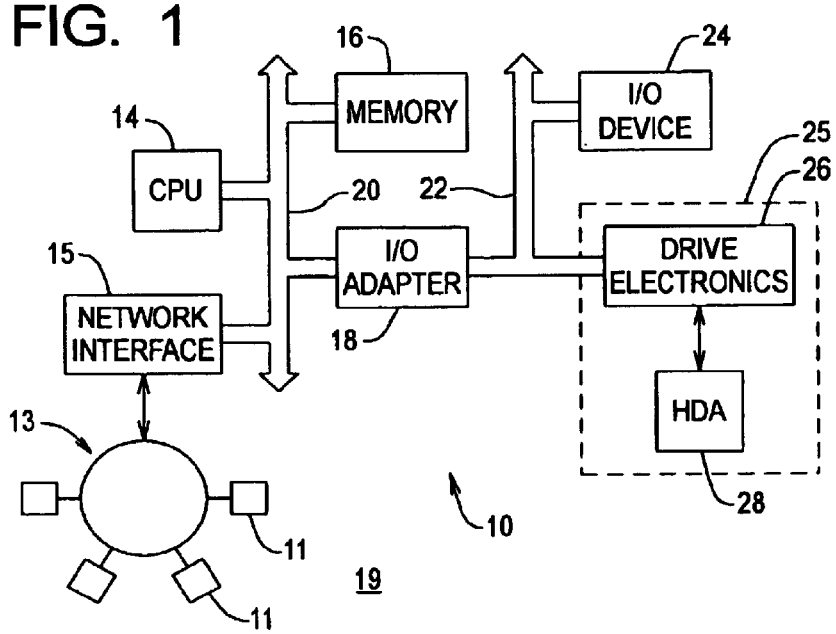
FIG. 1 shows a block diagram of the architecture of an embodiment of a computer system including a disk storage system according to an aspect of the present invention.
Figure 12:
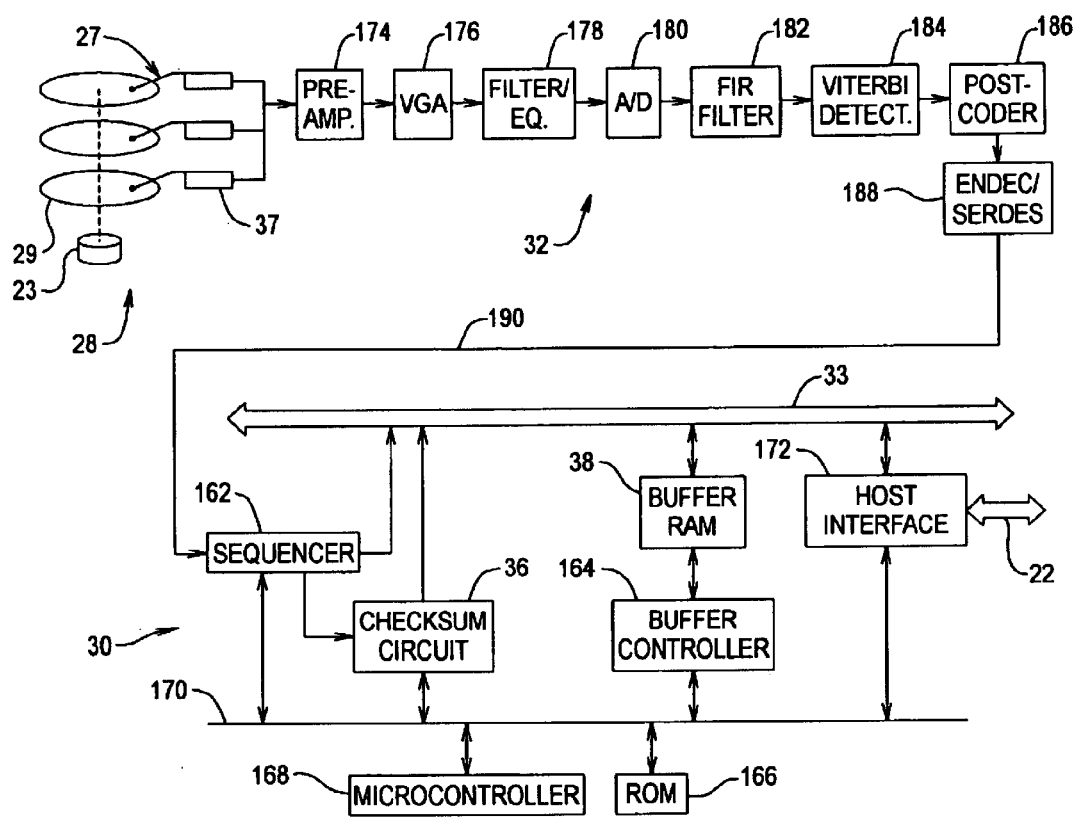
FIG. 12 is a block diagram of the architecture of another embodiment of the data controller of FIG. 2 including an example checksum circuit, receiving data from data disks through a read channel.

Referring to FIG. 1, an example computer system 10 is shown to include a central processing unit ("CPU") 14, a main memory 16, and I/O bus adapter 18, all interconnected by a system bus 20. Coupled to the I/O bus adapter 18 is an I/O bus 22 that can be e.g. a small computer system interconnect (SCSI) bus, and which supports various peripheral devices 24 including a disk storage unit such as a disk drive 25. The disk drive 25 includes drive electronics 26 and a head disk assembly 28 ("HDA"). As shown in FIG. 12, in one embodiment, the HDA 28 can include data disks 29 rotated by a spindle motor 23, and transducers 27 moved radially across the data disks 29 by one or more actuators 37 for writing data to and reading data from the data disks 29.

Figure 2:
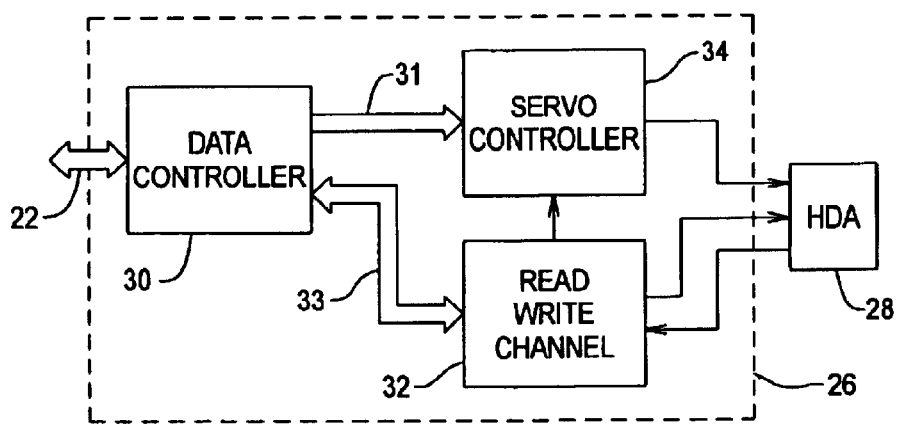
FIG. 2 shows a block diagram of the architecture of an embodiment of the drive electronics of FIG. 1.

Referring to FIG. 2, in one embodiment, the drive electronics 26 of FIG. 1 is shown to include a data controller 30 interconnected to a servo controller 34 via bus 31, and a read/write channel 32 interconnected to the data controller 30 via a-data buffer bus 33. Head positioning information from data disks are induced into the transducers, converted from analog signals to digital data in the read/write channel 32, and transferred to the servo controller 34, wherein the servo controller 34 utilizes the head positioning information for performing seek and tracking operations of the transducers 27 over the disk tracks.

A typical data transfer initiated by the CPU 14 to the disk drive 25 may involve for example a direct memory access ("DMA") transfer of digital data from the memory 16 onto the system bus 20 (FIG. 1). Data from the system bus 20 are transferred by the I/O adapter 18 onto the I/O bus 22. The data are read from the I/O bus 22 by the data controller 30, which formats the data into data segments with the appropriate header information and transfers the data to the read/write channel 32. The read/write channel 32 operates in a conventional manner to convert data between the digital form used by the data controller 30 and the analog form suitable for writing to data disks by transducers in the HDA 28.

For a typical request for transfer of data segments from the HDA 28 to the CPU 14, the data controller 30 provides a disk track location to the servo controller 34 where the requested data segments are stored. In a seek operation, the servo controller 34 provides control signals to the HDA 28 for commanding an actuator 37 to position a transducer 27 over said disk track for reading the requested data segments therefrom. The read/write channel 32 converts the analog data signals from the transducer 37 into digital data and transfers the data to the data controller 30. The data controller 30 places the digital data on the I/O bus 22, wherein the I/O adapter 18 reads the data from the I/O bus 22 and transfers the data to the memory 16 via the system bus 20 for access by the CPU 14.

Figure 3:
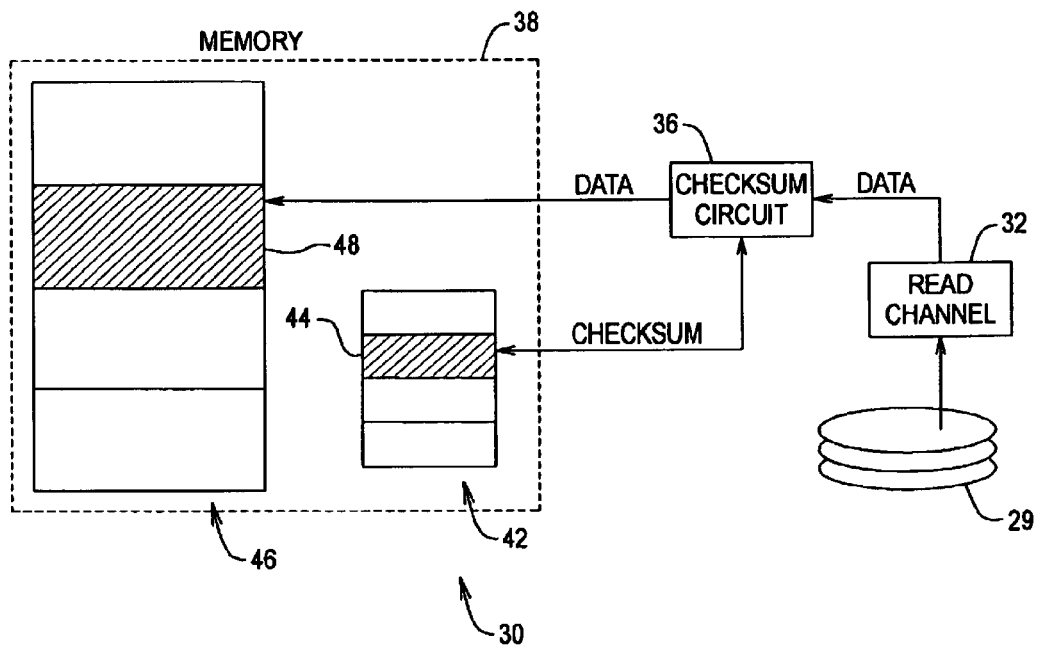
FIG. 3 shows a block diagram of the architecture of an embodiment of the data controller of FIG. 2 including an example checksum circuit, receiving data from data disks through a read channel.

Referring to FIG. 3, to provide checksum values for the requested data segments, in one embodiment the data controller 30 includes a checksum circuit 36 and a buffer memory 38 such as RAM for storing data segments 48 retrieved from data disks 29 in the HDA 28. Data signals from disks 29 are converted into digital data by the read channel 32. The digital data are blocked as data segments 48 of the same size for transfer into the memory 38. Generally, the checksum circuit 36 calculates checksum values for data segments 48 and stores the checksum values into the checksum list or table 42 in memory, such as in a designated part of the typical disk buffer RAM 38.

Figure 4:
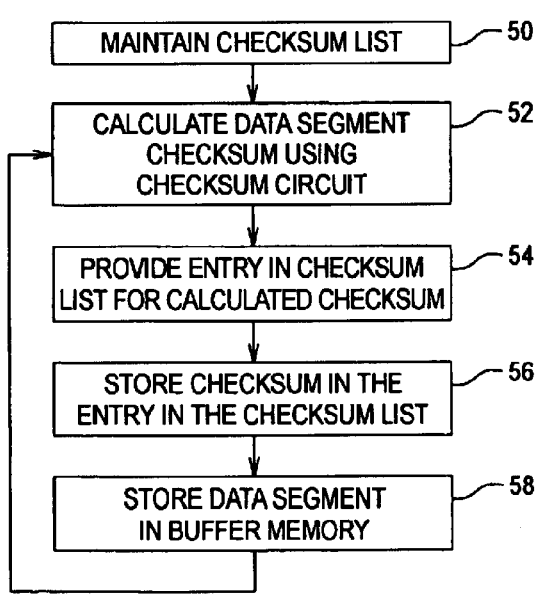
FIG. 4 shows a flow diagram of an embodiment of steps for calculating checksum values in the data controller of FIG. 3 according to the present invention.

Referring to FIG. 4 in conjunction with FIG. 3, in one example checksum process according to the present invention, the checksum list 42 is maintained for storing checksum values (step 50). The checksum list 42 comprises e.g. a plurality of entries 44 corresponding to the data segments 48 stored in a memory area 46 in the buffer memory 38, each entry 44 being for storing a checksum value for a corresponding data segment 48 stored in the buffer memory 38. For each data segment 48 retrieved from the disks 29, a checksum value for that data segment is calculated using the checksum circuit 36 (step 52), and an entry 44 in the checksum list 42 is provided for storing the calculated checksum value for that data segment 48 (step 54). The calculated checksum value is then stored in the selected entry 44 in the checksum list 42 (step 56). The data segment 48 is stored in the memory 38 (step 58). Preferably, calculating the checksum value for the data segment 48 in step 52 is performed as the data segment 48 is being transferred into the memory 38 from the reach channel 32 in step 58. Data segments 48 and corresponding checksum values can then be transferred out of the memory 38 and provided to the CPU 14 as described above.

Referring to FIG. 5, in one example, data can be transferred out of the memory 38 as packets 60 of data and a checksum value is determined for each packet 60 using the checksum values from the checksum list 42. In packaging the data segments 48 into the packets 60 for transfer out of the memory 38, a packet 60 can include a combination of one or more complete data segments 48 and/or one more segment fragments 62. In the following description, in each packet 60, a portion of a data segment 48 which is included in the packet 60 is termed as a data segment fragment 62, and the portion of that data segment 48 which is not included in the packet 60 is termed the complementary fragment 64.

Figure 5A:
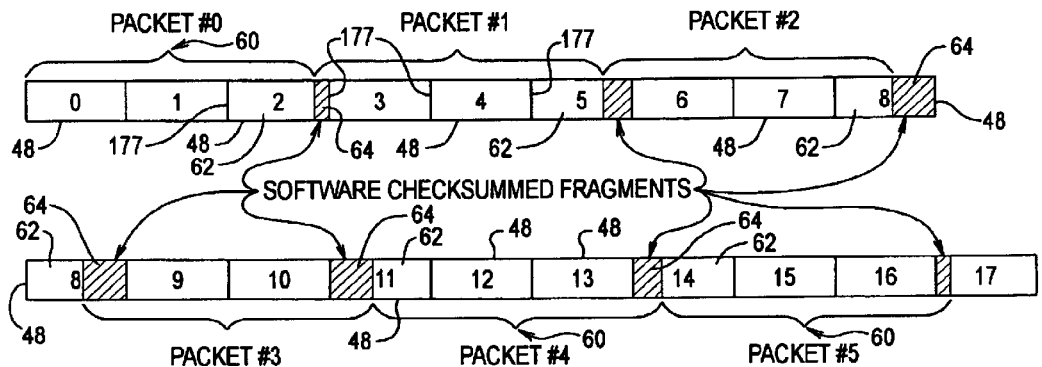
FIGS. 5A–C show examples of packaging of data segments in packets for transfer out of the buffer memory.

FIG. 5A shows six example packets 60, designated as packet #0, packet #1, packet #2, packet #3, packet #4, and packet #5. Each packet 60 includes at least one complete data segment 48 a data segment fragment 62 of one or more data segments 48. Each data segment 48 is 512 bytes in size and each packet 60 is 1460 bytes in size. In FIG. 5A, eighteen data segments 48, indexed as data segment numbers 0 through 17, are packaged in the packets packet #0 through packet #5 as shown. The packet #0 contains two complete data segments, numbers 0 and 1, and a fragment 62 of a data segment number 2. The packet #1 contains the complementary fragment 64 of the data segment number 2, the complete data segment numbers 3 and 4, and a fragment of the data segment number 5. The packet #2 contains the complementary fragment of the data segment number 5, the data segment numbers 6, 7 and a fragment of the data segment number 8. The packet #3 contains the complementary fragment of the data segment number 8, the data segment numbers 9 and 10, and a fragment of the data segment number 11. The packet #4 contains the complementary fragment of the data segment number 11, the data segment numbers 12, 13, and a fragment of the data segment number 14. And, the packet #5 contains the, complementary fragment of data segment number 14, the data segment numbers 15, 16, and a fragment of the data segment number 17.

As shown in FIG. 5A, for example, when considering packet #2, the portion of data segment number 8 included in packet #2 can be a data segment fragment 62 and the portion of data segment number 8 not included in packet #2 can be a complementary fragment 64. And, as is inherent in FIG. 5A, when considering packet #3, the portion of data segment number 8 included in packet #3 can be a data segment fragment 62 and the portion of data segment number 8 not included in packet #3 can be a complementary fragment 64.

Figure 5B:
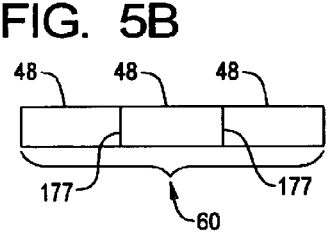
Figure 6:
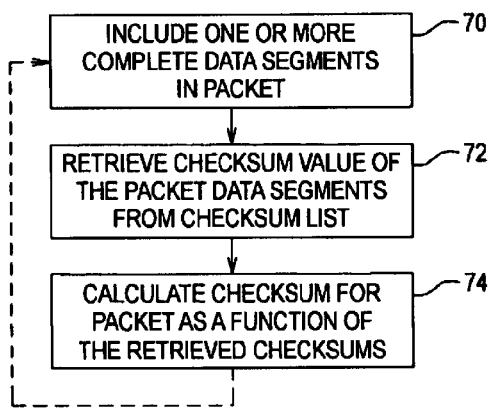
FIG. 6 shows a flow diagram of an embodiment of a process for providing checksum values for packets of one or more complete data segments.

Referring to FIG. 6 in conjunction with FIG. 5B, in one example packet building process, one or more complete data segments 48 are packaged in a packet 60 without any data segment fragments (step 70). A checksum value for the packet 60 is determined by retrieving the checksum value for each data segment 48 in that packet 60 from a corresponding entry in the check list 42 (step 72); and calculating a checksum value for that packet 60 as a function of the retrieved checksum values (step 74). The above steps are applicable to cases where the size of each packet 60 is an integer multiple of the size of each data segment 48. For example, where the size of each data segment 48 is 512 bytes, and the size of each packet 60 is 1536 bytes, each packet 60 can contain three complete data segments 48 therein. In another example, a packet 60 of size 2048 bytes can contain data from four complete 512 byte data segments 48.

Figure 7A:
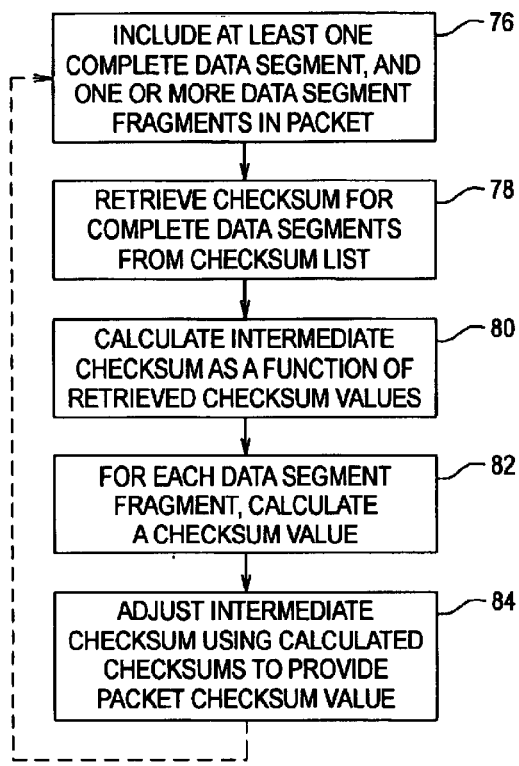
FIG. 7A shows a flow diagram of an embodiment of a process for providing checksum values for packets of at least one complete data segment and a fraction one or more data segments.

Referring to FIG. 7A in conjunction with FIG. 5A, in another example packet building process, at least one complete data segment 48, and a fragment 62 of one or more data segments are packaged in a packet 60 (e.g., packet #4) (step 76). A checksum value for the packet 60 is determined by: retrieving the checksum value for each of said one or more complete data segments 48 in that packet 60 from a corresponding entry in the checksum list 42 (step 78); calculating an intermediate checksum value as a function of the retrieved checksum values (step 80); for each fragment 62 of a data segment 48 in that packet 60, calculating a checksum value for data in that data segment fragment 62 (step 82); and adjusting the intermediate checksum value using the checksum values for said one or more data segment fragments 62 to provide a checksum value for all of the data in that packet 60 (step 84). Step 80 is optional, and packet checksum calculation can be performed in step 84 using the checksum values determined in steps 78 and 82.

Figure 7B:
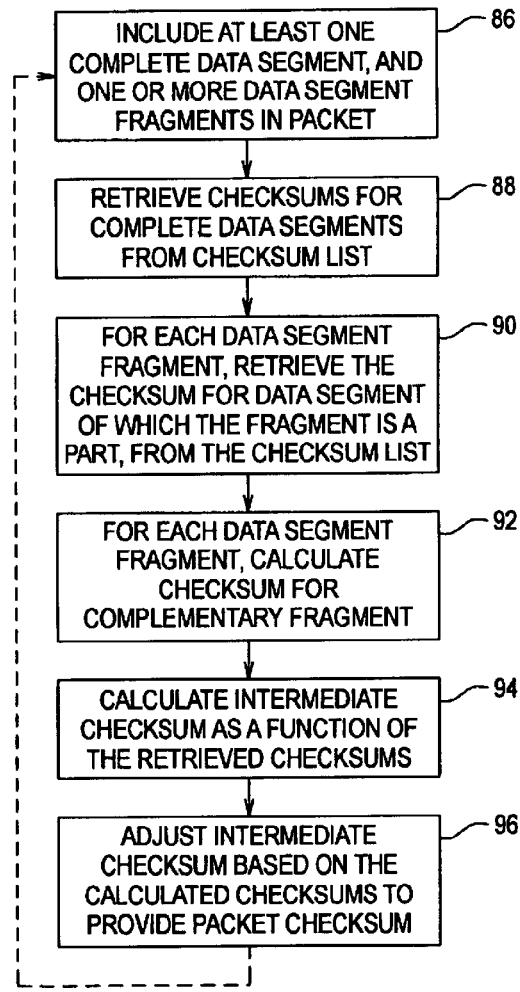
FIG. 7B shows a flow diagram of another embodiment of a process for providing checksum values for packets of at least one complete data segment and a fraction one or more data segments.

Referring to FIG. 7B, in yet another example packet building process, when at least one complete data segment 48, and a fragment 62 of one or more data segments 48 are packaged in a packet 60 (e.g., packet #4) (step 86), a checksum value for the packet 60 is determined by: retrieving the checksum value for the at least one complete data segment 48 in that packet 60 from a corresponding entry 44 in the checksum list 42 (step 88); for each of the one or more data segment fragments 62 in the packet 60: (i) retrieving the checksum value from the entry 44 in the checksum list 42 corresponding to the data segment 48 of which that data segment fragment 62 is a part (step 90), and (ii) calculating a checksum value for data in a complementary fragment 64 of that data segment 48 (step 92); calculating an intermediate checksum value as a function of the retrieved checksum values (step 94); and adjusting the intermediate checksum value using the checksum values for said one or more complementary data segment fragments 64 to provide a checksum value for all of the data in that packet 60 (step 96). Step 94 is optional, and packet checksum calculation can be performed in step 96 using the checksum values retrieved in steps 88, 90, 92.

Figure 7C:
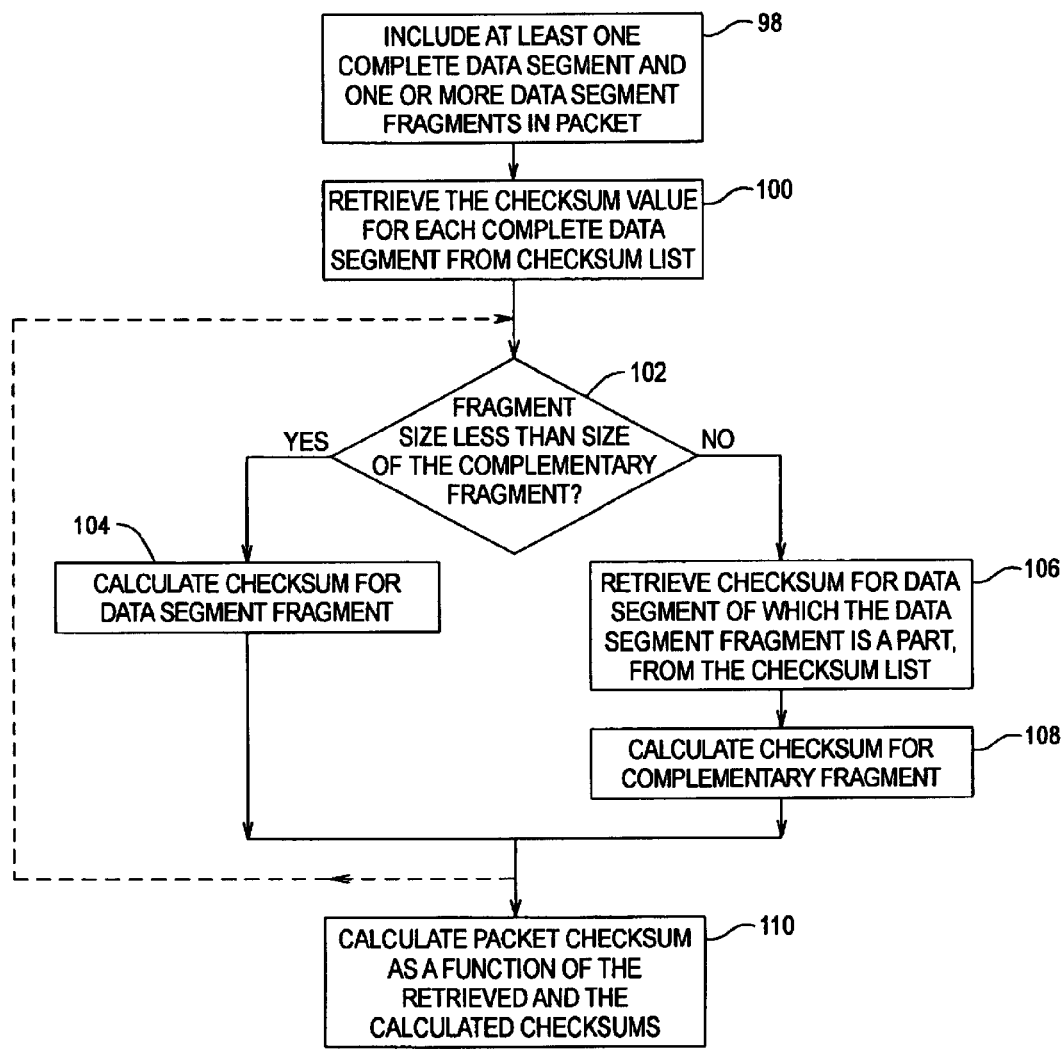
FIG. 7C shows a flow diagram of yet another embodiment of a process for providing checksum values for packets of at least one complete data segment and a fraction one or more data segments.

Referring to FIG. 7C, in another example packet building process, when at least one complete data segment 48, and a fragment 62 of one or more data segments 48 are packaged in a packet 60 (e.g., packet #4) (step 98), a checksum value for the packet 60 is determined by: retrieving the checksum value for said at least one complete data segment 48 in that packet 60 from a corresponding entry 44 in the checksum list 42 (step 100); for each of said one or more data segment fragments 48 in the packet 60, if that data segment fragment 62 is less in size than a complementary fragment 64 of the data segment 48 of which that data segment fragment 62 is a part (step 102), then calculating a checksum value for data in that data segment fragment 62 (step 104), otherwise, retrieving the checksum value from the entry in the checksum list 42 corresponding to said data segment 48 of which that data segment fragment 62 is a part (step 106), and calculating a checksum value for data in said complementary fragment 64 of that data segment (step 108).

Steps 102 through 108 are repeated as described above for each data segment fragment in the packet. The packet checksum is then determined as a function of the retrieved checksum values and the calculated checksum values (step 110). The step 110 of determining the packet checksum can include the steps of determining an intermediate checksum value based on the retrieved checksum values, and adjusting the intermediate checksum value using the calculated checksum values to provide the packet checksum value for all data in the packet 60.

Figure 5C:
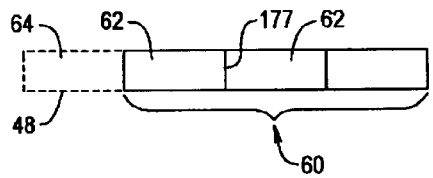
Figure 8:
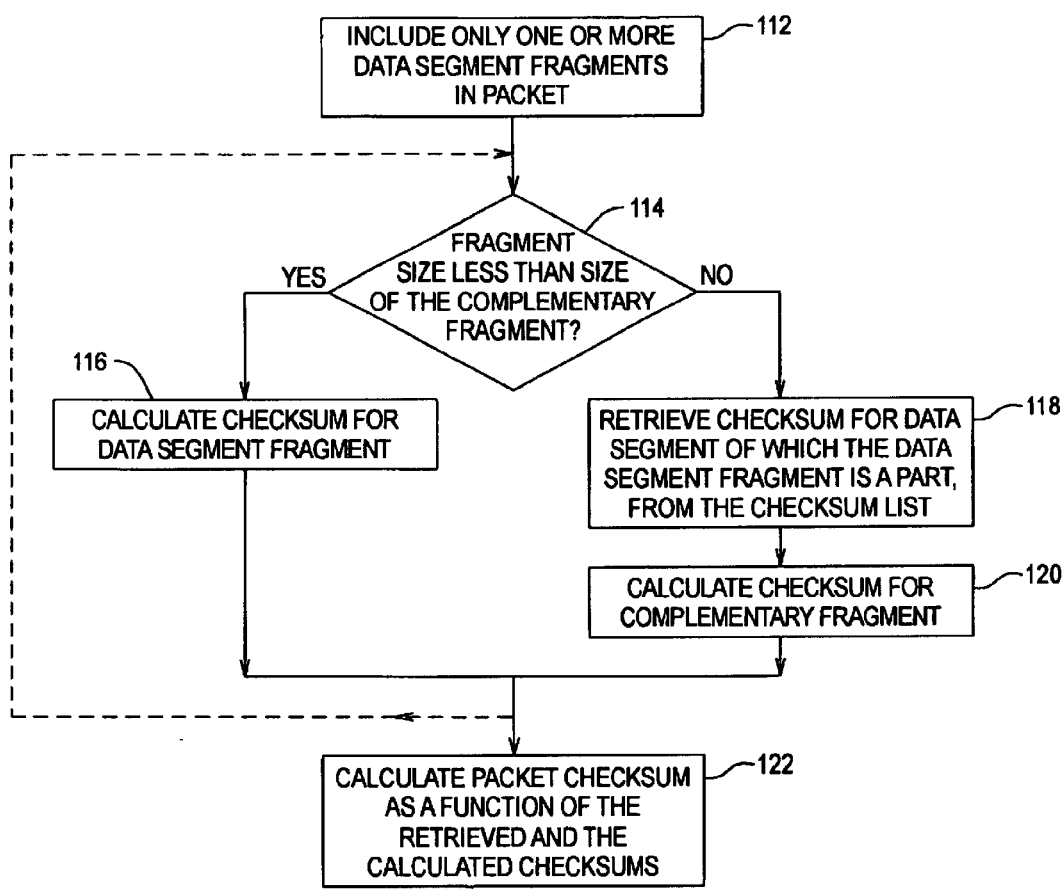
FIG. 8 shows a flow diagram of an embodiment of a process for providing checksum values for packets of one more data segment fragments.

Referring to FIG. 8 in conjunction with FIG. 5C, in an example packet building process, one or more packets 60 include a fragment 62 of one or more data segments 48, without any complete data segments (step 112). A such, each such packet 60 includes at least a fragment 62 of a data segment, and no complete data segments. A checksum value for each such packet 60 can be determined by steps including: for each data segment fragment 62 in that packet 60, if that data segment fragment 62 is less in size than a complementary fragment 64 of the data segment 48 of which that data segment fragment 62 is a part (step 114), then calculating a checksum value for data in that data segment fragment 62 by e.g. software instructions (step 116), otherwise, retrieving the checksum value from the entry 44 in the checksum list 42 corresponding to said data segment 48 of which that data segment fragment 62 is a part (step 118), and calculating a checksum value for data in said complementary fragment 64 of that data segment (step 120). Steps 114 through 120 are repeated as described above for each data segment fragment 62 in the packet 60. The packet checksum is then determined as a function of the retrieved checksum values and the calculated checksum values (step 122). Alternatively, steps 114, 118 and 120 can be eliminated, and a checksum value directly calculated for each data segment fragment 62 according to step 116 regardless of the relative size of the data segment fragments 62.

FIG. 9 shows example steps of another process for packaging (i.e. reblocking) data segments 48 into packets 60, and calculating checksums for the packets 60. The packet building process for each packet 60 comprises a loop starting with initializing a packet checksum (step 124), and determining the next block of data in the area 46 of the buffer memory 38 to include in the packet 60 (step 126). Each block of data can comprise a portion of one or more data segments 48 and/or one or more complete data segments. For this example, each data block can be a complete data segment 48, or a data segment fragment 62. If a next block of data is to be included in the packet 60 (step 128), the process determines if a checksum for the data block has been calculated by the checksum circuit 36 (step 130). If so, the process determines if the data block is a complete data segment 48 (step 132). If so, the checksum value for the data segment 48 is retrieved from the checksum table 42 and added to the packet checksum (step 134), and the process proceeds to step 126.

If in step 130 above, the process determines that a checksum value for the data block has not been determined, then the process calculates a checksum for the data block, wherein the data segment can comprise a complete data segment 48 or a data segment fragment 62 (step 136). That checksum value is then added to the packet checksum value in step 134, and the process proceeds to step 126. If in step 132, the process determines that the data block is not a complete data segment 48, and is a data segment fragment 62, then the process determines if the size of the data segment fragment 62 is less than, or equal to, half the size of a complete data segment 48 of which the data segment fragment 62 is a part (step 138). If so, the process calculates the checksum for that data segment fragment 62 (step 140) and caches the calculated checksum value for the data segment fragment 62 (step 142). The process then adds the calculated checksum value for the data segment fragment 62 to the packet checksum (step 134) and proceeds to step 126.

If, in step 138, the process determines that the size of the data segment fragment 62 is greater than, or equal to, half the size of the complete data segment 48, then the process calculates the checksum value for the complementary fragment 64 of the data segment fragment 62 (step 144). The process then retrieves the checksum value for the data segment 48 of which the data segment fragment 62 is a part, from the checksum table 42, and determines the checksum for the data segment fragment 62 as a function of the retrieved data segment checksum and the calculated complementary fragment checksum (step 146). The process then caches the data segment fragment checksum (step 142), adds it to the packet checksum (step 134) and proceeds to step 126. If in step 128, no other block of data is to be included in the packet, then the packet 60 and its checksum (i.e. the packet checksum) are sent to the packet requester in the network 13, for example (step 148). Steps 124 through 148 are repeated for each packet 60 as described above.

In one example implementation, the present invention can be utilized for calculating checksums in networks using networking protocols such as TCP/IP. Data to be transmitted onto a network typically requires a checksum per packet. The present invention reduces software overhead for determining data segment checksums when data segments 48 are read from e.g. a storage device and reblocked as packets for transmission over the network to a requester. The checksum values for data segments 48 are calculated using the checksum circuit 36 as data segments are transferred from data storage devices such as the disk drive 25 or tape drive into memory such as the buffer memory 38. The calculated checksum values are stored e.g. either in a separate checksum list 42 in the memory 38 as described above, or as a new field in the sector command descriptors in the disk control block of a disk drive ASIC. In one version, checksum values are calculated for every disk segment 48, wherein each disk data segment 48 is 512 bytes in size. Checksum values can also be calculated for sub- data segment blocks of data.

Data packets 60 are composed from combinations of whole (complete) and/or partial (fragment) data segments 48. The data segment checksum values are then used to determine packet checksums for outgoing network data packets 60 via addition, corrected for data segment fragments 62 used in some data packets 60. The packet checksum is then added to the network header checksum as appropriate, and stored into the packet header. Although the example herein is for a disk drive 25, the present invention is equally applicable to a tape drive or a server computer with a checksum-capable host interface. The checksumming technique of the present invention can also be applied where the data is to be encrypted before transmission. Because the checksum for the data segments 48 is calculated using a checksum circuit 36, rather than by software instructions executed by a processor, as a result CPU and memory bandwidth utilization is reduced, leading to improved throughput and latency in network-attached disk and tape drives.

In network environments utilizing the TCP/IP protocol suite, all data packets 60 using TCP, and many using UDP, as the transport protocol contain a data payload checksum. The data payload is comprises combinations of complete (whole) data segments 48, and/or fragments (portions) 62 or 64 of data segment 48. Since the payload checksum is stored in a packet header, the payload checksum must be calculated before a packet 60 is sent to the network. Conventional implementations of TCP/IP calculate the payload checksum in software as a separate pass over the payload data, thereby consuming precious CPU cycles and memory bandwidth. In several implementations of TCP/IP, the payload checksum is calculated as part of a data copy operation. The data is typically copied from a user buffer memory to a system buffer memory before transmission onto the network. Utilizing pipelined microprocessor architectures, the CPU instructions (e.g. addition) required to calculate the packet checksum is executed as the system microprocessor loads data from buffer memory for copying. This is termed "folding in" the checksum with the data copy. Other conventional TCP/IP implementations use "zero copy" techniques, so that payload data is not copied from one location to another location as part of packet transmission. Since the payload data is not copied, folding in the checksum with the data copy is inapplicable.

Figures 10A, 10B, 10C:
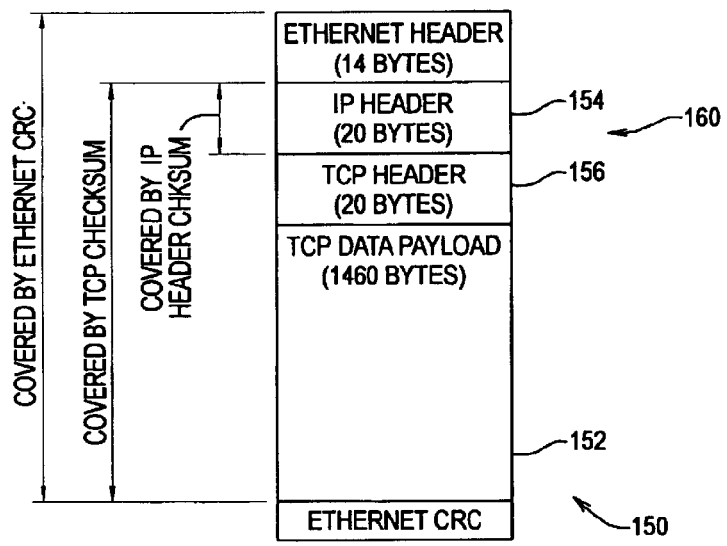
FIGS. 10A–C illustrate example layouts for a TCP/IP packet in an Ethernet frame, an IP header with normal fields, and a pseudo header generated from the IP header, respectively.

The present invention can be applied to improve all said conventional implementations, whereby data segment checksum values are calculated using the checksum circuit 36 according to the present invention, and the packet checksum is determined as a function of the data segment checksum values. Specifically, the transport-level checksum value in TCP packets, and optionally in UDP packets, is a simple 16-bit ones-complement addition value. The checksum value stored in the packet 60 is the ones-complement of the addition value, so that on checksumming the packet with the checksum, the result is zero. This checksum allows end-to-end checking of data, while link-layer cyclic redundancy checks (CRCs) can be used to detect on-the-wire corruption. The TCP checksum protects against most software-caused inadvertent packet corruption, e.g. in routers. FIG. 10A illustrates an example layout for a TCP/IP packet 150 in an Ethernet frame, generally indicating the portions of the packet 150 covered by the relevant checksums and CRC values. The TCP checksum covers a data payload 152 and most, but not all, of IP and TCP headers 154 and 156, respectively. FIG. 10B illustrates an example IP header 154 with normal fields. In particular, the time-to-live (TTL) Offset value and the header checksum fields of the IP header 154 are not checksummed. Any IP options are also not covered. Referring to FIG. 10C, a pseudo header 158 is generated from the IP header 154 and is provided to TCP/IP for checksum.

An important benefit of using checksums is the ease with which sub-checksums for portions of data in a packet 150 can be calculated to create a complete checksum 14 for at least all the data payload in a packet 150. The checksum can be easily corrected for excess data. Referring back to FIGS. 1, 3, 5A–C and 10, in an example, the disk drive 25 utilizes TCP/IP in an Ethernet environment, with 1500 byte network packets 150, each composed of 1460 byte data payload 152 and a 40 byte TCP/IP header 160 which includes the IP and TCP headers 154, 156, respectively. As each 512-byte data segment 48 is transferred from the disk 29 into the buffer memory 38, a checksum value for the data segment 48 is calculated by the checksum circuit 36, and stored in the checksum list 42. Then for transferring data segments 48 out of the buffer memory 38, combinations of one or two complete data segments 48 and/or one or two data segment fragments 62 are used to compose a data payload 152 for each TCP packet 150, based on the alignment of the TCP packet 150 relative to data segment boundaries.

Where only complete data segments 48 are included in a packet 150, then the checksum values for the complete data segments 48 are retrieved from the checksum list 42 and added together to generate the packet checksum value. Where fragments 62 of data segments 48 are also included in the packet 150, for each included segment fragment 62, the smaller of that segment fragment 62 and the excluded complementary fragment 64, is checksummed in software and is used to generate the packet checksum. Specifically, if the size of the included segment fragment 62 is less than, or equal to, half the size of the data segment 48, then the checksum for the segment fragment 62 is calculated in software, and added to the retrieved checksums for the complete data segments in the packet 150 to generate the packet checksum.

Otherwise, if the included segment fragment 62 is more than half the size of the data segment 48, then: (i) the checksum for that data segment 48 is retrieved from the checksum list 42, (ii) the checksum for the excluded complementary fragment 64 of that data segment 48 is calculated in software and subtracted from the retrieved checksum for that data segment 48, and (iii) the difference is added to the retrieved checksums for complete data segments 48 to generate the total packet checksum. In either case, the checksums calculated in software are cached in a memory area, such as in memory 38 or memory 16, so that they may be reused in a similar checksum process for the next TCP packet 150 which will likely include said excluded complementary fragments 64.

The placement of data segment boundaries relative to packet boundaries can be a uniform random distribution, and checksum values for consecutive packets 150 are determined as described above. In the above example, because checksums are calculated in software only for a smaller fragment 62 of a data segment 48, the amount of data checksummed in software is always less than 256 bytes. Therefore, with said random placement, the average amount of data checksummed in software in each packet 150 is 128 bytes, compared to 1460 bytes in conventional methods where the checksum for all payload data in each packet 150 is calculated in software.

Referring back to the packets in FIGS. 5A–C, example alignment of the packets 60 relative to the boundaries 177 of data segment 48 are shown. Further, data segment fragments 62 and complementary fragments 64 that are checksummed in software are highlighted in gray. The table in FIG. 11 shows data segment offsets for the packets shown in FIG. 5A, where packet #0 starts with a data segment offset of zero. A fragment 62 of a data segment within a current packet 60 under consideration is referred to as the "inner" fragment, and the unused complementary fragment 64 outside the current packet 60 is referred to as the "outer" fragment. Further, a data segment fragment 62 at the front of the packet 60, from left to right, is referred to as the "leading" fragment, and a data segment fragment at the end of the packet 60 is referred to as the "trailing" fragment. As such, the inner trailing data segment fragment 62 for one packet becomes the outer leading fragment 64 for the next packet. In FIG. 5A, all packets after packet #0 obtain the checksum for leading data segment fragments therein from the checksum values cached for previous packets as described above. The software checksum size in said table 42 is for the trailing fragments in each packet.

FIG. 12 shows a block diagram of the architecture of another embodiment of the data controller 30 (FIG. 2) including an example checksum circuit 36, receiving data from data disks 29 through the read channel 32. The data controller 30 includes a sequencer 162, the buffer memory 38 (e.g., a cache buffer), a buffer controller 164, the checksum circuit 36, a ROM 166, and the data path microcontroller 168, interconnected to a microbus control structure 170 and the buffer data bus 33 as shown. The data controller 30 further includes a high level interface controller 172 implementing a bus level interface structure, such as SCSI II target, for communications over the bus 22 with the I/O Adaptor 18 (e.g. SCSI II host initiator adapter) within the computer system 10 (FIG. 1).

The microcontroller 168 comprises a programmed digital microcontroller for controlling data formatting and data transfer operations of the sequencer 162 and data block transfer activities of the interface 178. The channel 32 can utilize a "partial response, maximum likelihood detection" or "PRML" signaling technique. PRML synchronous data detection channels frequently employ analog-to-digital converters such as e.g. six-bit flash analog-to-digital converters for providing synchronous samples of the analog signal read from the data disks 29. One example of a PRML synchronous data detection channel is found in commonly assigned U.S. Pat. No. 5,341,249, entitled: "Disk Drive Using PRML Class IV Sampling Data Detection with Digital Adaptive Equalization", the disclosure thereof being incorporated herein by reference.

The drive electronics 25 includes a preamplifier circuit 174 and voltage gain amplifier ("VGA") 176, such that magnetic flux transitions sensed by the selected data transducers 27 are preamplified as an analog signal stream by the preamplifier circuit 174, and passed through the VGA 176 for controlled amplification on route to the channel 32. The channel 32 can comprise an analog programmable filter/equalizer 178, a flash analog-to-digital ("AND") converter 180, a digital adaptive finite impulse response ("FIR") filter 182, a Viterbi detector 184, and a postcoder 186. The voltage controlled analog signal stream from the VGA 176 is passed through the programmable analog filter/equalizer 178. Equalized analog read signals from the filter 178 are then subjected to sampling and quantization within the AND converter 180. Data samples from the A/D converter 180 are then passed through the FIR filter 182 which employs adaptive filter coefficients for filtering and conditioning the raw data samples in accordance e.g. with desired PR4 channel response characteristics in order to produce filtered and conditioned data samples. The bandpass filtered and conditioned data samples leaving the FIR filter 182 are then passed to the Viterbi detector 184 which decodes the data stream, based upon the Viterbi maximum likelihood algorithm employing a lattice pipeline structure implementing a trellis state decoder, for example. The decoded data put out by the detector 184 are passed through a postcoder 186 which restores the original binary data values.

The binary data values are deserialized by an encoder-decoder/serializer-deserializer 188 ("ENDEC/SERDES"), wherein the ENDEC/SERDES 188 frames and puts out e.g. eight bit user bytes in accordance with an inverse of the 8/9ths rate coding convention (nine code bits for every eight user data bits). The ENDEC/SERDES 188 can be in accordance with commonly assigned U.S. Pat. No. 5,260,703, the disclosure of which is incorporated herein by reference. The decoded user bytes are then passed to the sequencer 162 along the path 190, and the sequencer 162 stores the user data bytes as data segments 48 in the memory 38 via the bus 33. The sequencer 162 sequences the data segments 48 between the buffer memory 38 and data disks 29. The buffer memory controller 164 controls the buffer memory 38. The bus level interface circuit 172 transfers data segments between the buffer memory 38 and the bus 22. The microcontroller 168 controls the sequencer 162, buffer controller 164 and the bus level interface circuit 172. The microcontroller 168 can also include functions for transducer positioning servo loop control via the servo controller 34 (FIG. 2).

Specifically, the data sequencer 162 sequences blocks of data (e.g. data segments 48) to and from the disks 29 at defined data block storage locations thereof. The sequencer 162 is connected to the read/write channel 32 and is directly responsive to block segment counts for locating and assembling in real time the data segments 48 read from and written to the data storage surfaces of disks 29, and for handling data segment transfers between the disks 29 and the buffer memory 38. The buffer memory controller 164 generates and puts out addresses to the buffer memory 38 for enabling the buffer memory 38 to transfer data segments 48 to and from the sequencer 162 via the bus 33. The microcontroller 168 includes data block transfer supervision routines for supervising operations of the sequencer 162, the buffer memory controller 164 and the host bus interface 172. The microcontroller 168 can further include servo supervision routines for controlling the servo controller 34 for positioning the transducers 27 over data tracks on disks 29 for read/write operations. The commonly assigned U.S. Pat. No. 5,255,136, entitled "High capacity submicro-winchester fixed disk drive", issued to Machado, et. al, provides a detailed example of the operation of the sequencer 162 in conjunction with the reach channel 32. The disclosure of the U.S. Pat. No. 5,255,136 is incorporated herein by reference.

As data segments 48 are transferred by the sequencer 162 into the buffer memory 38, the checksum circuit 36 calculates checksum values for the data segments 48 and stores the checksum values in the checksum table 42. The checksum circuit 36 can comprise a logic circuit configured to perform a checksum function. For example, a logic circuit for the above TCP example can comprise a ones-complement adder. The checksum circuit 36 can also comprise a PLD or programmable gate array, configured with a set of instructions to create a logic circuit for checksumming. Examples of such program instructions can be found in "Implementing the Internet Checksum in Hardware", by J. Touch and B. Parham, ISI, RFC 1936, April 1996; and "Computing the Internet Checksum", by R. Braden, D. Borman and C. Partridge, ISI, RFC 1071, September 1988, incorporated herein by reference.

The checksum circuit 36 automatically calculates a checksum value for each data segment 48 read from the disks 29 and stores the checksum value in the checksum table 42. In one example, the microcontroller 168 allocates the checksum table 42 in the memory 38, and provides the checksum circuit 36 with the base address of the table 42 in the buffer memory 38. Then for each incoming data segment 48, the checksum circuit 36 calculates a checksum value, and also shifts down the address in buffer memory 38 where the data segment 48 is being stored (e.g. shift down towards the least significant bits by 9 bits). The checksum circuit 36 then uses the shifted down value as an index to the checksum table 42 for storing the checksum value for the data segment 48. Specifically, utilizing the base address of the checksum table 42 and the index, the checksum circuit 36 determines the entry location within the table 42 to store the checksum value calculated for the data segment 48. The checksum circuit 36 then repeats the process for the next incoming data segment 48 as transferred from the sequencer 162 to the memory 38 via the bus 33.

Figure 13:
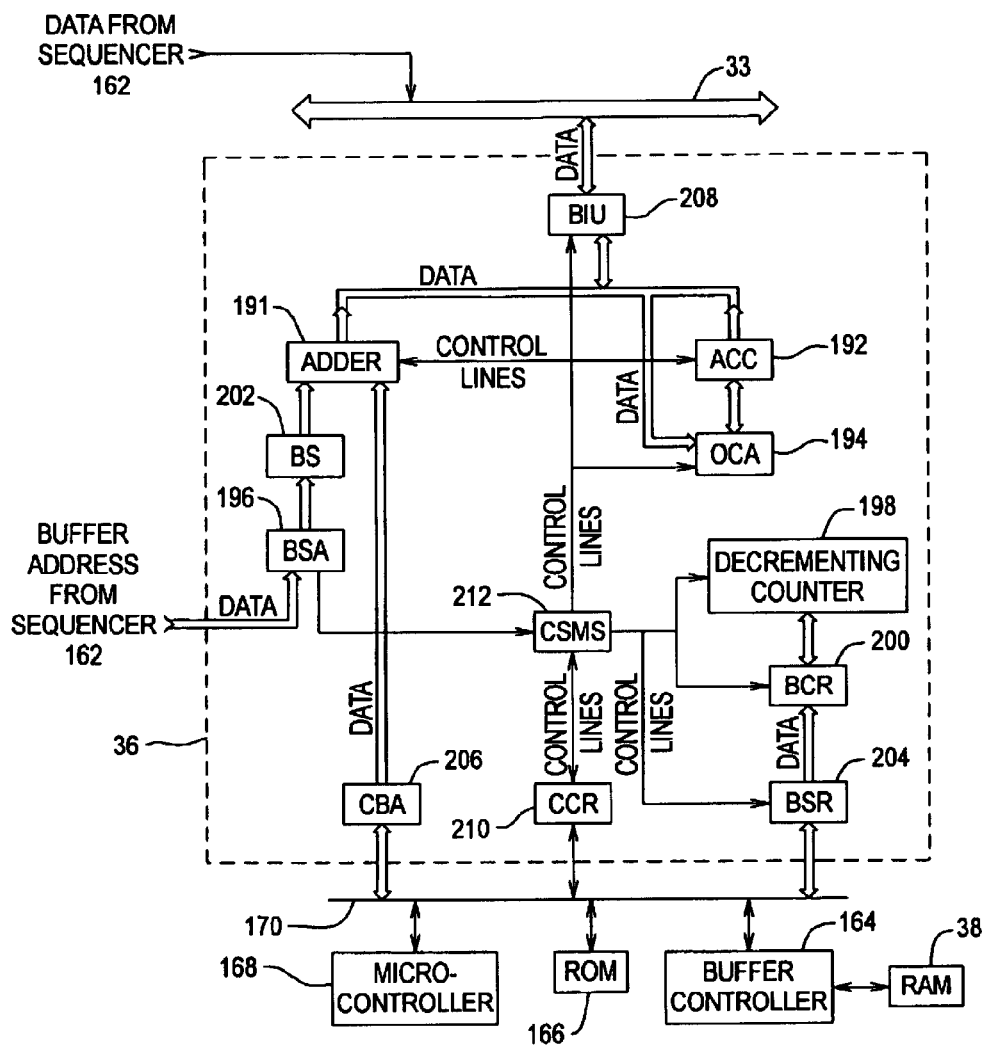
FIG. 13 is a block diagram of the architecture of an embodiment of the checksum circuit of FIG. 12.

FIG. 13 shows a block diagram of the architecture of an embodiment of the checksum circuit 36 of FIG. 12. The checksum circuit 36 comprises an adder 191; an accumulator ("ACC") 192; a one's complement adder ("OCA") 194 having the same bit width as the buffer data bus 33; a buffer start address register ("BSA") 196; a decrementing counter 198; a buffer count register ("BCR") 200; a barrel shifter ("BS") 202; a buffer size register ("BSR") 204; checksum base address register ("CBA") 206 for checksum table 42 in buffer RAM 38; a buffer data bus interface ("BIU") 208 to support passive listening, arbitration and data driving capabilities of the checksum circuit 36; a read/write checksum control register ("CCR") 210 with enable/disable (W) and sequencing error (R); and a checksum microsequencer ("CSMS") 212.

In operation, the checksum circuit 36 is initialized by the microcontroller 168 at the start. The microcontroller 168 allocates an area of the buffer RAM 38 for the checksum table 42, wherein the size of the checksum table 42 can be e.g. the product of the number of data segments 48 and the size of a checksum table entry, such as eight, sixteen or thirty two bits per entry. The microcontroller 168 then writes the base address of the table 42 into the CBA register 206. As such, the CBA register 206 is not modified by the checksum circuit 26. The CBA register 206 is a configuration register written by the microcontroller 186 when the checksum circuit 36 is initialized. The microcontroller 168 then enables the checksum circuit 36 by writing an enable bit in the checksum control register CCR 210.

The sequencer 162 writes the memory address of the data buffer 46 for string data segments 48 in the memory 38 into the BSA register 196 before transferring data onto the buffer data bus 33 to be stored in the memory 38. The microcontroller 168 can write the size of the data buffer 46 in the BSR register 204. The CSMS 212 copies the contents of the BSA register 168 into the BCR register 200 at the start of a segment write to the memory 38. The microsequencer CSMS 212 checks the buffer count register BCR 200, and if the count therein is non-zero, the CSMS 212 signals an error to the microcontroller 168. The error signal indicates that the checksum circuit 36 is currently computing a checksum value for another data segment, and is being asked to start another checksum calculation. This situation can arise when a sequencing or hardware error results in fewer bytes than the size of a data segment to be included in a currently active checksum calculation. Such errors can include incorrect setting of the BSR register 204, or the BIU 208 missing one or more words of data segments 48 written onto the data bus 33.

If the count in the BCR 200 is zero, the CSMS 212 writes "0" into the accumulator ACC 192, copies the contents of the register BSR 204 into the BCR register 200, and starts passively listening on buffer data bus 33 via the BIU 208 for data transfer from the sequencer 162 to the buffer RAM 38. As data is written by the sequencer 162 into buffer RAM 38 via the buffer data bus 33, the BIU 208 listens to the data on the buffer data bus 33, and the CSMS 212 passes a copy of each word of the data on the bus 33 to the ones-complement adder OCA 194, which adds it to the accumulator ACC 192 and stores the value back in the ACC 192. The CSMS 212 then instructs the decrementing counter 198 to subtract one from the BCR 200. When the BCR 200 reaches zero, the CSMS 212 calculates the address in memory to store the checksum accumulated in ACC 192.

Said address for storing the accumulated checksum is calculated by the adder 191 as follows. The start address of the data buffer 46, stored in the BSA register 196, is shifted down towards its least significant bits by the shifter BS 202. The address in the BSA register 196 is shifted down by a number of bits represented by the difference ($\log_2$ (BSR)–$\log_2$ (BWS)), wherein BWS is the bus word size in bytes. For example, if a data segment 48 is 512 bytes in size, and the bus 33 is thirty two bits wide (i.e. four bytes), the shift down value is: ($\log_2$ 512–$\log_2$ 4)=9–2=7. In this example, the accumulator ACC 192 has the same width as the data bus 33. The BSA register 196 is shifted down in the BS 202 by seven bits to provide the offset from the checksum table 42 base address in the CBA register 206. The offset from the BS 202, and the checksum table 42 base address in the CBA register 206 are input to the adder 191 to calculate the address to store the data segment checksum. The adder 191 adds the contents of the CBA register 206 to the shifted start address from the BS 202 (offset) to calculate said address for storing the checksum accumulated in the ACC 192. The checksum accumulated in the accumulator ACC 192 is then written to the calculated address in the checksum table 42. Other embodiments of the checksum circuit 36 are possible and contemplated by the present invention. Further the steps performed by the microcontroller 168 can be performed by the CPU 14 instead, or in conjunction with the microcontroller 168.

In the above embodiments of the present invention, the checksum circuit 36 is integrated into the data controller 30 for calculating checksums for data transferred from the disk 29 into the buffer memory 38 in the data controller 30. The memory 38 can be external to the data controller 30 within the drive electronics 26. Alternatively, the checksum circuit 36 can be incorporated into the read channel 32 of the disk drive or tape drive electronics ASIC, wherein the buffer memory 38 is connected to the read channel 32. After determining a checksum value for every 512 by data segment 48 from the disks 29, the checksum value is stored into the checksum table 42 in the memory 38. In either case, each data segment 48 is checksummed as it is transferred into the memory 38, and the checksum value for that data segment 48 is stored into a entry 44 in the checksum table 42 upon completion of the data segment transfer. As detailed above, in one embodiment of the checksum circuit 36, a base register defining the start address of the table 42 is utilizes and the checksum value for each data segment 48 is stored into table 42 with the same index as in the memory area 46 into which the data segment 48 is stored. In another example, the checksum value for each data segment is stored as part of the data segment transfer control block on disks 29, along with such information as the segment status.

Figure 14:
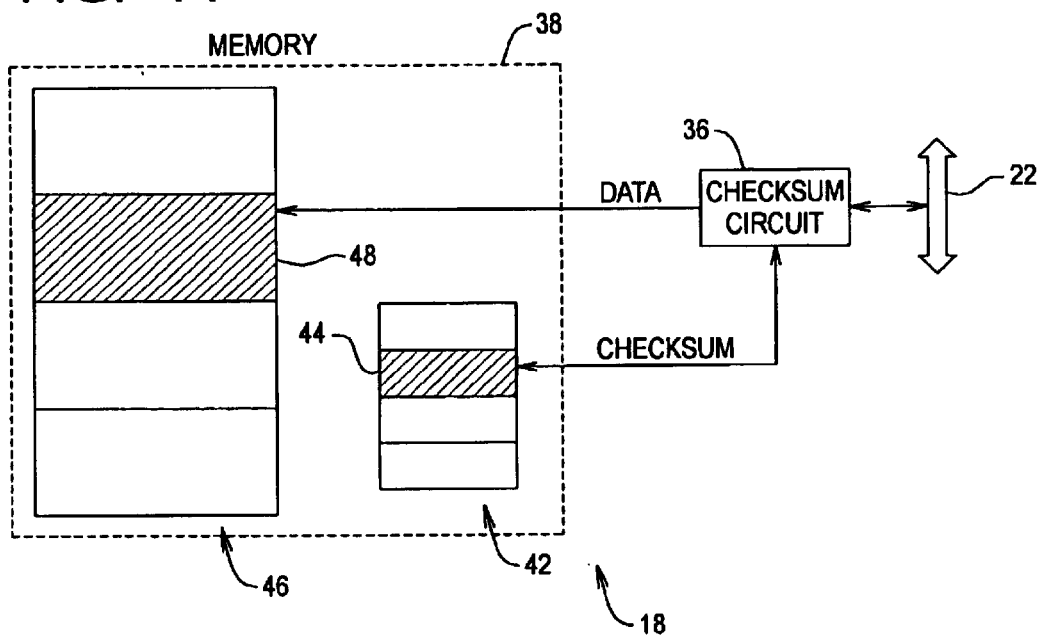
FIG. 14 is a block diagram of an embodiment of the I/O adapter of FIG. 1 including an example checksum circuit according to another aspect of invention.

Referring to FIG. 14, in another embodiment of the present invention, the I/O adapter 18 includes the checksum circuit 36 and the buffer memory 38. The buffer memory 38 can be part of the main system memory 16. The I/O adapter 18 can comprise e.g. an ATA or SCSI interface card. Data segments 48 from the disk drive 25 are transferred to the I/O adapter 18 via the bus 22, wherein the I/O adapter 18 calculates checksums for data segments 48 using the checksum circuit 36 as they are received therein via the bus 22. The checksums are stored in the checksum list 42 as described above. In paged memory systems, the checksum for each page can also be stored in the same area of kernel memory that is used to control the page.

Further, for host interface checksums, the storage device 25 can calculate the checksums rather than the host bus adapter 18. The communication of said checksums to the host (e.g. CPU 14) is then accomplished by a MESSAGE IN phase on a SCSI bus. Specifically, after the storage device finishes a DATA IN phase in which data is transferred to the host, the storage device then changes to a MESSAGE IN phase and transfers the checksums corresponding to the transferred data.

The present invention can be used in any data processing environment where units of data such as blocks, segments, sectors, etc. are buffered for transmission onto a network such as a network system 19 (FIG. 1). Typical applications include e.g. Network File Service (NFS) and Common Internet File Service (CIFS) bulk data service protocols. The data buffering can be performed within a storage device such as the disk drive 25. Further, the disk drive 25 can provide an IP-based bulk data service. Alternatively, the data buffering can be performed within a file server computer such as a Network Appliance or a Unix or NT machine operating as a file server, where the checksum is made available through a storage device interface. Further, the present invention can be used in any networked data processing system such as a system utilizing TCP/IP. In the latter case, when the TCP data payload size is an integer multiple of the data segment size, management of data segment fragment checksums may not be required.

Accordingly, referring back to FIG. 1, in another aspect of the present invention, the computer system 10 can further comprise a network interface device 15 connected to the bus 20 for data communication between the computer system 10 and other computer systems 11 via a network link 13 in the networked data processing system 19. The checksum circuit 36 can be placed anywhere along the data path from the disks 29 in the disk drive 25 and the network link 13 connected to the network interface device 15.

Figure 15:
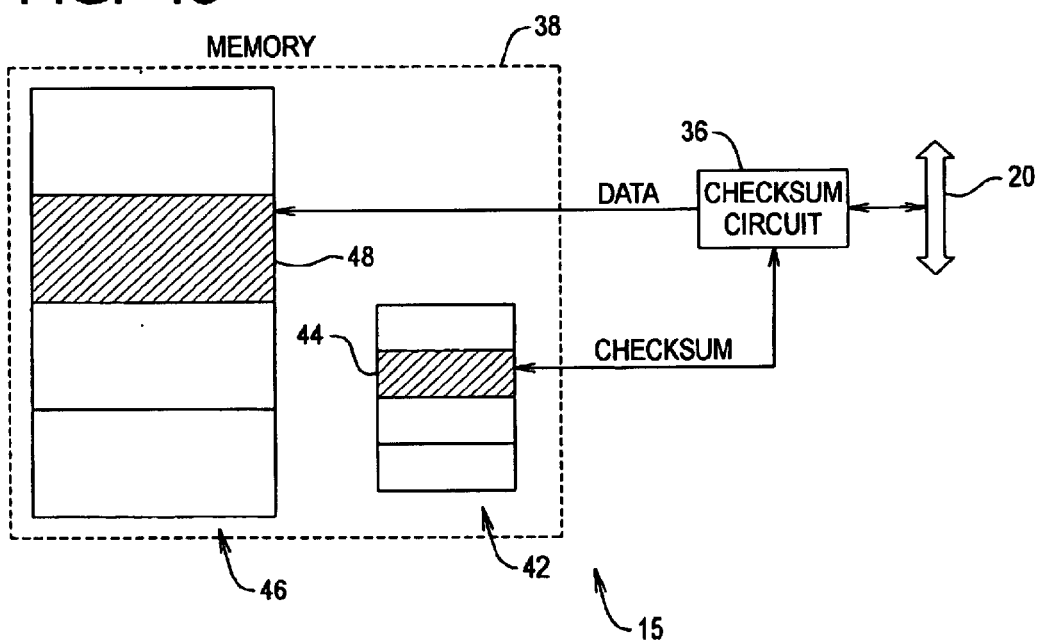
FIG. 15 is a block diagram of an embodiment of the network interface device of FIG. 1 including an example checksum circuit according to another aspect of the present invention.

As such, the checksum circuit 36 can be moved and placed in the final stage of moving retrieved data segments 48 to the network interface device 15. For example, as shown in FIG. 15, in one embodiment of the present invention, the network interface device 15 includes the checksum circuit 36 for calculating and storing checksum values for the data segments 48 in the checksum list 42. The buffer memory 38 can be e.g. a part of the network interface device 15, or a part the main system memory 16. Data segments 48 are retrieved from the disk drive 25 and transferred to the network interface device 15 without calculating checksums. Specifically, data segments 48 from the disk drive 25 are transferred to the I/O adapter 18 via the I/O bus 22, then to the system bus 20 via the I/O adapter 18, and then to the network interface 15 via the system bus 20. The data segments 48 stored in the buffer memory 38, and the data segments 48 can be modified before inclusion in packets 150 and transmission over the network link 13. The network interface device 15 can include circuits and routines for performing steps of determining the parts of each packet 150 that are to be checksummed and the possibly variable location of the checksum's insertion point offset. For example, Ethernet headers, the IP TTL, IP fragment headers and IP options, and trailing Ethernet padding are not checksummed. When the checksum engine 36 is integrated in the network interface device 15, specific routines can be utilized to provide data encryption (e.g., IPSEC payload encryption) after the TCP packet checksum calculation wherein the checksum itself is encrypted.

In the embodiments of the present invention described herein, the reblocking processes described above in conjunction with FIGS. 4, and 6–9, can be used to configure the CPU 14 or the microcontroller 168 to perform said reblocking processes. In the latter case, program instructions (software) embodying said reblocking processes can be stored in the memory 16 and executed by the CPU 14 (FIG. 1). The CPU 14 retrieves the checksum values from the checksum table 42 within the memory 38, and calculates the packet checksums as described above. Further, the checksum values for data segment fragments 62 and complementary fragments 64 are computed utilizing computer instructions executed by the CPU 14.

Appendix A provides example program instructions for computing a partial checksum TCP/UDP fragments as described above. Further, Appendix B provides example program instructions for reblocking data segments into e.g. TCP/IP packets 150, and calculating checksums for packets 150 according to a reblocking process such as described above in conjunction with the flow diagram of FIG. 9.

In on example checksumming and reblocking operation wherein the CPU 14 executes the reblocking program instructions, data segments 48 flow from the disks 29 through the read channel 32 to the buffer memory 38, wherein the checksum circuit 36 calculates a checksum value for each data segment. The checksum circuit 36 can reside e.g. in the channel 32, in the data controller 30, in the I/O adapter 18 or in the network interface 15, for example. The memory area 46 or the buffer memory 38 for buffering the data segments can be e.g. in the memory 16, in the electronics 26, in the I/O adapter 18, or in the network interface 15. The checksum table 42 can be e.g. in a designated area in the memory 38 or in the memory 16. The CPU 14 can be primarily responsible for network protocol program instructions. The reblocking software in the CPU 14 is invoked to form packets 150 of data segments 48 to transfer from the memory 38 through the network 19 via the network link 13. Routines according to Network protocol stacks such as TCP/IP, can be included in the CPU 14 to recognize the completion of data segments 48 arriving from disks 29 into the buffer memory 38, and then to execute the reblocking process to create the packets 150, and other protocol processing code, before the packets 150 are sent out through the link 13 via the network interface 15.

As configured by the reblocking program instructions, the CPU 14 calculates the memory address and length of each data block for inclusion in a data packet 150. As described above in conjunction with TCP/IP implementations of the process of the present invention, if the memory address of a data block is at the boundary 177 of a data segment 48 (FIG. 5A), then to retrieve the checksum value for that data segment 48, the CPU 14 divides the memory address (e.g. 32 bits) of the data segment 48 by the size of the data segment e.g. 512. The division is equivalent to discarding the nine least significant bits of the memory address (or shifting the high order twenty three bits of the address down by nine), and using the shifted value as an index into the checksum table 42 to retrieve the checksum of that data segment 48. The checksum table 42 is indexed by data segment number, which is determined by the memory address of the data segments 48 in the buffer memory 38.

If the memory address of the data block (i.e. start address of a data block to be included in a packet 150) is within the data segment 48, then to determine the byte offset of said data block from the beginning of the data segment 48, the CPU 14 utilizes the nine least significant bits of the data block memory address to determine said offset. The size of a data segment fragment, defined by the start address of the data block within the data segment 48 and a boundary of the data segment 48, is also determined. The data segment fragment for inclusion in the packet is checksummed as detailed above. If the length of the data block is such that the data block is entirely within the boundaries of a data segment, then in one example, the data in the data block can be checksummed completely in software. Alternatively the checksum value for the data block can be determined as a function of one or more of the checksum values in the checksum table 42 and/or cached checksum values as described above.

For example, referring back to FIG. 5A, if the memory address of the first data block to be stored in the data packet #1 is 1460, then dividing 1460 by 512 as the size of the data segments 48 provides an index value of 2 into the checksum table 42 for retrieving the checksum value of a corresponding target data segment (e.g. data segment number 2). Further, the least significant nine bits of that memory address provide the offset value of 436 bytes within said target data segment. As such the data block to be included in the packet begins at an offset of 436 bytes from the beginning of the target data segment in the buffer memory 38. Because 436 bytes is more than half of the data segment length of 512 bytes, the CPU 14 performs a software checksum for the 76 byte fragment 64 of the data segment 48 as a first data portion of packet #1 in FIG. 5A shown in gray.

Referring to FIG. 12, in another embodiment of the present invention where the microcontroller 168 executes a reblocking process, the microcontroller 168 retrieves the checksum values from the checksum table 42 within the memory 38, and calculates the packet checksums as described above. Further, the checksum values for data segment fragments 62 and complementary fragments 64 are computed utilizing computer instructions executed by the microcontroller 168. The example program instructions in Appendix A and Appendix B are used to configure the microcontroller 168 to perform the reblocking processes. The microcontroller 168 and related circuitry such as the bus 170, buffer controller 164, ROM 166, buffer RAM 38 and the checksum circuit 36, can be placed along the data path from the disks 29 to the host interface 15 as described above.

In on example checksumming and reblocking operation, data segments 48 flow from the disks 29 through the read channel 32 to the buffer memory 38, wherein the checksum circuit 36 calculates a checksum value for each data segment. The reblocking software in the microcontroller 168 is invoked to form packets 150 of data segments 48 to transfer from the memory 38 to the host interface 172. Routines according to Network protocol stacks such as TCP/IP, can be included in the microcontroller 168 to recognize the completion of data segments 48 arriving from disks 29 into the buffer memory 38, and then to execute the reblocking process to create the packets 150, and other protocol processing code, before the packets 150 are sent to the interface 172.

As configured by the reblocking program instructions, the microcontroller 168 calculates the memory address and length of each data block for inclusion in a data packet 150. As described above in conjunction with TCP/IP implementations of the process of the present invention, if the memory address of a data block is at the boundary 177 of a data segment 48 (FIG. 5A), then to retrieve the checksum value for that data segment 48, the microcontroller 168 divides the memory address (e.g. 32 bits) of the data segment 48 by the size of the data segment e.g. 512. The division is equivalent to discarding the nine least significant bits of the memory address (or shifting the high order twenty three bits of the address down by nine), and using the shifted value as an index into the checksum table 42 to retrieve the checksum of that data segment 48. The checksum table 42 is indexed by data segment number, which is determined by the memory address of the data segments 48 in the buffer memory 38.

If the memory address of the data block (i.e. start address of a data block to be included in a packet 150) is within the data segment 48, then to determine the byte offset of said data block from the beginning of the data segment 48, the microcontroller 168 utilizes the nine least significant bits of the data block memory address to determine said offset. The size of a data segment fragment, defined by the start address of the data block within the data segment 48 and a boundary of the data segment 48, is also determined. The data segment fragment for inclusion in the packet is checksummed as detailed above. If the length of the data block is such that the data block is entirely within the boundaries of a data segment, then in one example, the data in the data block can be checksummed completely in software. Alternatively the checksum value for the data block can be determined as a function of one or more of the checksum values in the checksum table 42 and/or cached checksum values as described above.

For example, referring back to FIG. 5A, if the memory address of the first data block to be stored in the data packet #1 is 1460, then dividing address 1460 by 512 as the size of the data segments 48 provides an index value of 2 into the checksum table 42 for retrieving the checksum value of a corresponding target data segment (e.g. data segment number 2). Further, the least significant nine bits of that memory address provide the offset value of 436 bytes within said target data segment. As such the data block to be included in the packet begins at an offset of 436 bytes from the beginning of the target data segment in the buffer memory 38. Because 436 bytes is more than half of the data segment length of 512 bytes, the microcontroller 168 performs a software checksum for the 76 byte fragment 64 of the data segment 48 as a first data portion of packet #1 in FIG. 5A shown in gray.

In another embodiment, the reblocking program instructions can be packaged into two groups of modules such that the CPU 14 executes a first group of the modules and the microcontroller 168 executes a second group of the modules, whereby the microcontroller 168 operates in conjunction with the CPU 14 to accomplish the reblocking steps above.

In one aspect, the present invention provides significant performance improvements for data service from disk or tape drives through a buffer memory onto a network. Calculating checksums using a checksum circuit 36 as data is transferred into a buffer memory 38 substantially reduces memory bandwidth consumed and the number of CPU instruction cycles needed for software checksums. Further, data transfer latency for checksums is reduced. For example, as is conventional, a software checksum routine coded in x86 assembler language uses requires execution of nineteen CPU instructions to checksum every thirty two bytes of data, requiring execution of about 870 instructions to checksum 1460 bytes of data. By contrast, utilizing the present invention, checksumming 1460 bytes of data requires on average execution of only eight CPU instructions, providing a reduction of 790 instruction executions per packet.

A conventional software TCP/IP implementation in a general-purpose operating system requires about 4,000 CPU instructions for software checksum calculation per packet, including one data copy and one checksum pass. In such conventional implementations, more than 20% of the CPU instruction executions per packet sent are for checksum calculation. By utilizing the present invention for calculating checksums, a reduction of 790 instruction executions per packet is achieved, effectively providing about a 20% reduction in the CPU cost of TCP/IP transmissions. Further, in a conventional one-copy TCP/IP stack, data moves across the memory bus four times—once on data read before being transmitted onto the network, once for software checksum calculation, and twice for data copy (e.g., read and write). Utilizing the present invention for calculating checksum values reduces the memory bandwidth requirements by 25%.

Where a conventional zero-copy TCP/IP stack is used in an embedded, non-virtual memory software environment rather than a general purpose operating system, the total overhead for packet transmission can be between 2000 to 3000 instructions per packet. Utilizing the present invention eliminates 790 instructions per packet sent and can reduce CPU utilization by about 30%. Where a conventional zero-copy TCP stack is used, the software checksum represents half of the total memory bandwidth requirements. Utilizing the present invention, the memory bandwidth requirements for checksum calculation can be reduced by about 50%.

As described herein, a checksum value calculated for a data segment 48 and stored in the checksum list 42 need not be the actual checksum for the data segment 48. The checksum value can be e.g. a quantity which is a function of the actual checksum. In the example program instructions in Appendix B, the checksum value is a 32-bit number representing the actual checksum, wherein the 32-bit number checksum value can be converted to the actual checksum by adding the two 16-bit halves of the 32-bit number checksum value together, and performing a logical NOT on the result to obtain an actual 16-bit checksum transmitted in the packet. The same technique applies to the checksum values calculated for the data segment fragments and the checksum values for the complementary fragments.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of providing checksum values for data segments retrieved from a data storage device for transfer into a buffer memory, comprising the steps of:
   (a) maintaining a checksum list comprising a plurality of entries corresponding to the data segments stored in the buffer memory, each entry for storing a checksum value for a corresponding data segment stored in the buffer memory; and
   (b) for each data segment retrieved from the storage device:
      (1) calculating a checksum value for that data segment using a checksum circuit for performing a checksum function;
      (2) storing the checksum value in an entry in the checksum list; and
      (3) storing the data segment in the buffer memory;

wherein, for transferring packets of data out of the buffer memory, a checksum value can be calculated for data in each packet based on one or more checksum values stored in the checksum list.

2. The method of claim 1, wherein step (b)(1) further includes the steps of calculating the checksum for said data segment using the checksum circuit as the data segment is transferred into the buffer memory.

3. The method of claim 1 further comprising the steps of:
   (c) building packets of data for transfer out of the buffer memory, and
   (d) providing a checksum value for data in each packet based on one or more checksum values stored in the checksum list.

4. The method of claim 3, wherein:
   each packet in a set of said packets includes one or more complete data segments; and
   the step (d) of providing a checksum value for each of the packets in said set of packets further includes the steps of:
      (1) retrieving the checksum value for each data segment in that packet from a corresponding entry in the checksum list; and
      (2) calculating a checksum value for that packet as a function of the retrieved checksum values.

5. The method of claim 3, wherein:
   each packet in a set of said packets includes: (i) one or more complete data segments, and (ii) a fragment of each of one or more data segments; and
   the step (d) for providing a checksum value for each of the packets in said set of packets further includes the steps of:
      (1) retrieving the checksum value for each of said one or more complete data segments in that packet from a corresponding entry in the checksum list;
      (2) for each data segment fragment in that packet, calculating a checksum value for data in that data segment fragment; and
      (3) determining a checksum value for all of the data in that packet as a function of the retrieved and calculated checksum values.

6. The method of claim 5 further comprising the steps of:
   for at least one packet in step (d), caching one or more of said calculated checksum values for the data segment fragments in that packet, wherein the cached checksum values can be used for determining a checksum value for a subsequent data packet.

7. The method of claim 6 wherein:
   for at least one data segment fragment in each of one or more of said set of packets in step (d), the step of calculating a checksum value for that data segment fragment in step (d)(2) further includes the steps of calculating the checksum value for that data segment fragment as a function of one or more previously cached checksum values.

8. The method of claim 3, wherein:
   each packet in a set of said packets includes: (i) at least one complete data segment, and (ii) a fragment of each of one or more data segments; and
   the step (d) for providing a checksum value for data in each of the packets in said set of packets further includes the steps of:
      (1) retrieving the checksum value for said at least one complete data segment in that packet from a corresponding entry in the checksum list;

(2) for each of said one or more data segment fragments in the packet, retrieving the checksum value from the entry in the checksum list corresponding to the data segment of which that data segment fragment is a part, and calculating a checksum value for data in a complementary fragment of that data segment; and (3) determining a checksum value for all of the data in that packet as a function of the retrieved and calculated checksum values.

9. The method of claim 8, wherein step (d)(3) includes the steps of:

calculating an intermediate checksum value as a function of the retrieved checksum values; and adjusting the intermediate check sum value using the calculated checksum values to provide the checksum value for all the data in that packet.

10. The method of claim 8 further comprising the steps of:

for at least one packet in step (d), caching one or more of said calculated checksum values in step (d)(2), wherein the cached checksum values can be used for determining a checksum value for a subsequent data packet.

11. The method of claim 10 wherein:

for at least one data segment fragment in each of one or more of said set of packets in step (d), step (d)(2) further includes the steps of calculating the checksum value of said complementary fragment as a function of one or more previously cached checksum values.

12. The method of claim 3, wherein:

each packet in a set of said packets includes: (i) at least one complete data segment, and (ii) a fragment of each of one or more data segments; and the step (d) for providing a checksum value for each of the packets in said set of packets further includes the steps of:

(1) retrieving the checksum value for said at least one complete data segment in that packet from a corresponding entry in the checksum list;

(2) for each of said one or more data segment fragments in the packet, if that data segment fragment is smaller in size than a complementary fragment of the data segment of which that data segment fragment is a part, then calculating a checksum value for data in that segment fragment, otherwise, retrieving the checksum value from the entry in the checksum list corresponding to said data segment of which that data segment fragment is a part, and calculating a checksum value for data in said complementary fragment of that data segment; and (3) providing a checksum value for the data in that packet as a function of said retrieved checksum values and said calculated checksum values.

13. The method of claim 12 further comprising the steps of:

for at least one packet in step (d), caching one or more of said calculated checksum values in step (d)(2), wherein the cached checksum values can be used for determining a checksum value for a subsequent data packet.

14. The method of claim 13, wherein for at least one data segment fragment in each of one or more of said set packets in step (d), step (d)(2) further includes the steps of:

if that data segment fragment is smaller in size than a complementary fragment of the data segment of which that data segment fragment is a part, then calculating a checksum value for data in that data segment fragment as a function of one or more previously cached checksum values;

otherwise, retrieving the checksum value from the entry in the checksum list corresponding to said data segment of which that data segment fragment is a part, and calculating a checksum value for data in said complementary fragment of that data segment as a function of one or more previously cached checksum values.

15. The method of claim 3, wherein:

each packet in a set of said packets includes a fragment of each of one or more data segments;

the steps of providing a checksum value for each of the packets in said set of packets further includes the steps of:

for each fragment of a data segment in that packet, calculating a checksum value for data in that data segment fragment; and determining a checksum value for all of the data in that packet as a function of the calculated checksum values.

16. The method of claim 15, wherein for at least one data segment fragment, the step of calculating a checksum includes the steps of:

retrieving the checksum value from the entry in the checksum list corresponding to the data segment of which that data segment fragment is a part;

calculating a checksum value for data in a complementary fragment of that data segment; and determining the checksum value for that data segment fragment as a function of: (i) said retrieved checksum value, and (ii) said calculated checksum value for data in the complementary fragment.

17. A storage device comprising:

(a) storage media for storing data segments;

(b) buffer memory; and (c) a checksum circuit for providing checksum values for data segments retrieved from the storage media for transfer into the buffer memory, and for storing the checksum values in a checksum list including a plurality of entries corresponding to the data segments stored in the buffer memory, each entry for storing a checksum value for a corresponding data segment in the buffer memory;

wherein, for transferring packets of data out of the buffer memory, a checksum value can be calculated for data in each packet based on one or more checksum values stored in the checksum list.

18. The storage device of claim 17, wherein the checksum circuit further comprises:

(i) a logic circuit for calculating a checksum value for a data segment;

(ii) means for locating an entry in the checksum table corresponding to that data segment; and (iii) means for storing the checksum value in the located entry in the checksum list.

19. The storage device of claim 17, further comprising a microcontroller that builds packets of data for transfer out of the buffer memory, and provides a checksum value for data in each packet based on one or more checksum values stored in the checksum list.

20. The storage device of claim 19, wherein:

each packet in a set of said packets includes one or more complete data segments, and the microcontroller further provides a checksum value for each of the packets in said set of packets by retrieving the checksum value for each data segment in that packet from a corresponding entry in the checksum list and calculating a checksum value for that packet as a function of the retrieved checksum values.

21. The storage device of claim 19, wherein:

each packet in a set of said packets includes one or more complete data segments, and a fragment of each of one or more data segments; and the microcontroller further provides a checksum value for each of the packets in said set of packets by:
(i) retrieving the checksum value for each of said one or more complete data segments in that packet from a corresponding entry in the checksum list;
(ii) for each data segment fragment in that packet, calculating a checksum value for data in that data segment fragment; and
(iii) determining a checksum value for all of the data in that packet as a function of the retrieved and calculated checksum values.

22. The storage device of claim 19, wherein:

each packet in a set of said packets includes at least one complete data segment, and a fragment of each of one or more data segments; and the microcontroller further provides a checksum value for data in each of the packets in said set of packets by:
(i) retrieving the checksum value for said at least one complete data segment in that packet from a corresponding entry in the checksum list;
(ii) for each of said one or more data segment fragments in the packet, retrieving the checksum value from the entry in the checksum list corresponding to the data segment of which that data segment fragment is a part, and calculating a checksum value for data in a complementary fragment of that data segment; and
(iii) determining a checksum value for all of the data in that packet as a function of the retrieved and calculated checksum values.

23. The storage device of claim 19, wherein:

each packet in a set of said packets includes a fragment of each of one or more data segments; and the microcontroller further provides a checksum value for each of the packets in said set of packets by:
for each fragment of a data segment in that packet, calculating a checksum value for data in that data segment fragment; and
determining a checksum value for all of the data in that packet as a function of the calculated checksum values.

24. The storage device of claim 23, wherein for at least one data segment fragment, the microcontroller further:

retrieves the checksum value from the entry in the checksum list corresponding to the data segment of which that data segment fragment is a part;
calculates a checksum value for data in a complementary fragment of that data segment; and
determines the checksum value for that data segment fragment as a function of said retrieved checksum value, and said calculated checksum value for data in the complementary fragment.

25. A checksum system for a data processing system including at least one data storage device and buffer memory, the checksum system being for providing checksum values for data segments retrieved from the data storage device for transfer into the buffer memory, the checksum system comprising:

(a) a checksum list including a plurality of entries corresponding to the data segments stored in the buffer memory, each entry for storing a checksum value for a corresponding data segment stored in the buffer memory;
(b) a logic circuit for calculating a checksum value for each data segment;
(c) means for locating an entry in the checksum table corresponding to that data segment; and
(d) means for storing the checksum values in the located entry in the checksum list;

wherein, for transferring packets of data out of the buffer memory, a checksum value can be calculated for data in each packet based on one or more checksum values stored in the checksum list.

26. The checksum system of claim 25 further comprising a processor configured for building packets of data for transfer out of the buffer memory, and for providing a checksum value for data in each packet based on one or more checksum values stored in the checksum list.

27. The checksum system of claim 26, wherein:

each packet in a set of said packets includes one or more complete data segments, and the processor is further configured to provide for providing a checksum value for each of the packets in said set for packets by retrieving the checksum value for each data segment in that packet from a corresponding entry in the checksum list and calculating a checksum value for that packet as a function of the retrieved checksum values.

28. The checksum system of claim 26, wherein:

each packet in a set of said packets includes one or more complete data segments, and a fragment of each of one or more data segments; and the processor is further configured to provide a checksum value for each of the packets in said set of packets by:
(i) retrieving the checksum value for each of said one or more complete data segments in that packet from a corresponding entry in the checksum list;
(ii) for each data segment fragment in that packet, calculating a checksum value for data in that data segment fragment; and
(iii) determining a checksum value for all of the data in that packet as a function of the retrieved and calculated checksum values.

29. The checksum system of claim 26, wherein:

each packet in a set of said packets includes at least one complete data segment, and a fragment of each of one or more data segments; and the processor is further configured to provide a checksum value for data in each of the packets in said set of packets by:
(i) retrieving the checksum value for said at least one complete data segment in that packet from a corresponding entry in the checksum list;
(ii) for each of said one or more data segment fragments in the packet, retrieving the checksum value from the entry in the checksum list corresponding to the data segment of which that data segment fragment is a part, and calculating a checksum value for data in a complementary fragment of that data segment; and
(iii) determining a checksum value for all the data in that packet as a function of the retrieved and calculated checksum values.

* * * * *